United States Patent [19]

Bennett

[11] Patent Number: 5,068,733

[45] Date of Patent: Nov. 26, 1991

[54] MULTIPLE ACCESS TELEVISION

[76] Inventor: Richard H. Bennett, Rte. 3, Rutledge Lake Rd., Greenville, S.C. 29611

[21] Appl. No.: 658,416

[22] Filed: Feb. 19, 1991

Related U.S. Application Data

[63] Continuation of Ser. No. 497,754, Mar. 20, 1990, abandoned, which is a continuation of Ser. No. 394,312, Aug. 11, 1989, abandoned, which is a continuation of Ser. No. 243,901, Sep. 13, 1988, abandoned, which is a continuation-in-part of Ser. No. 84,339, Aug. 10, 1987, abandoned, which is a continuation-in-part of Ser. No. 923,344, Oct. 27, 1986, abandoned.

[51] Int. Cl.$^5$ ............... H04N 5/262; H04N 5/268; H04N 7/12
[52] U.S. Cl. .................................................. 358/181
[58] Field of Search ............... 358/181, 183, 185, 186, 358/188, 108, 22, 86; 455/4, 5, 6

[56] References Cited

U.S. PATENT DOCUMENTS

| 1,769,920 | 7/1930 | Gray | 358/186 |
| 2,878,318 | 3/1959 | Leek | 358/142 |
| 4,777,526 | 10/1988 | Saitoh | 358/191.1 |

Primary Examiner—Tommy P. Chin
Attorney, Agent, or Firm—Bailey & Hardaway

[57] ABSTRACT

A novel process of broadcasting live televised programs, whereby multiple video options are made available to the viewer on existing conventional cable ready receivers and are obtainable by viewer selection.

1 Claim, 2 Drawing Sheets

MULTIPLE ACCESS TELEVISION

This application is a continuation of application Ser. No. 07/497,754, filed 03/20/90, now abandoned, which is a continuation of application Ser. No. 07/394,312, filed 8/11/89, now abandoned, which is a continuation of application Ser. No. 07/243,901, filed 09/13/88 now abandoned, which is a continuation-in-part of application Ser. No. 07/084,339, filed Aug. 10, 1987, now abandoned, which in turn is a continuation-in-part of Ser. No. 06/923,344, filed Oct. 27, 1986, now abandoned.

BACKGROUND OF THE INVENTION

This invention relates generally to the art of broadcast systems and more specifically to a broadcasting process for live, televised programs offering video and audio options.

Currently, all television viewers are committed to watch programs whose video and audio portions are unnecessarily limited. Whereas multiple cameras are involved in current broadcasting techniques, the view transmitted is selected and relayed at the discretion of broadcasters in a remote network studio in conjunction with a single audio from the program source. Viewers seriously interested in a particular actor or musical instrument, for example, or in a particular segment of an athletic event or circus performance are restricted to the view and camera angle selected by the broadcaster as well as to the single audio of the program line.

SUMMARY OF THE INVENTION

It is thus an object of this invention to provide a novel process for broadcasting live televised programs offering multiple video options while either retaining a single audio signal from program source or allowing for alternative audio signals from one or more camera positions to be transmitted in addition to and simultaneously with the audio signal from program source.

This as well as other objects are accomplished by a novel process for broadcasting live televised programs comprising obtaining video signals from a plurality of video cameras, each of which is relaying a different view of a single event or production, producing a single audio signal associated with the vent or production as well as an audio signal for each of the video cameras, and transmitting all audio and video signals simultaneously.

DETAILED DESCRIPTION OF THE DRAWINGS

Figure 1A:
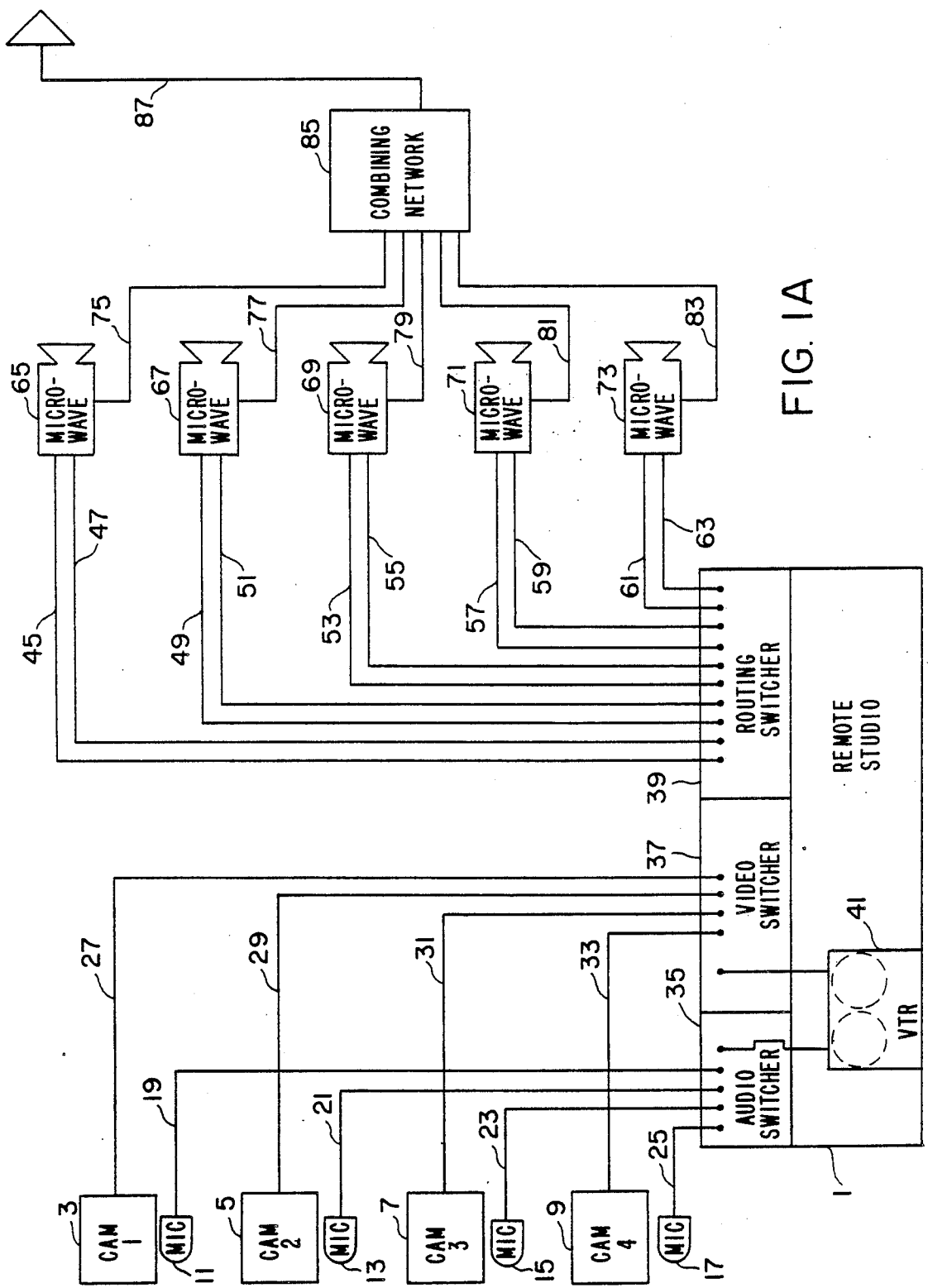
FIGS 1A and 1B of the drawing are a schematic representation of electrical components associated in such a way as to carry out the process for broadcasting live televised programs in accordance with this invention.
Figure 1B:
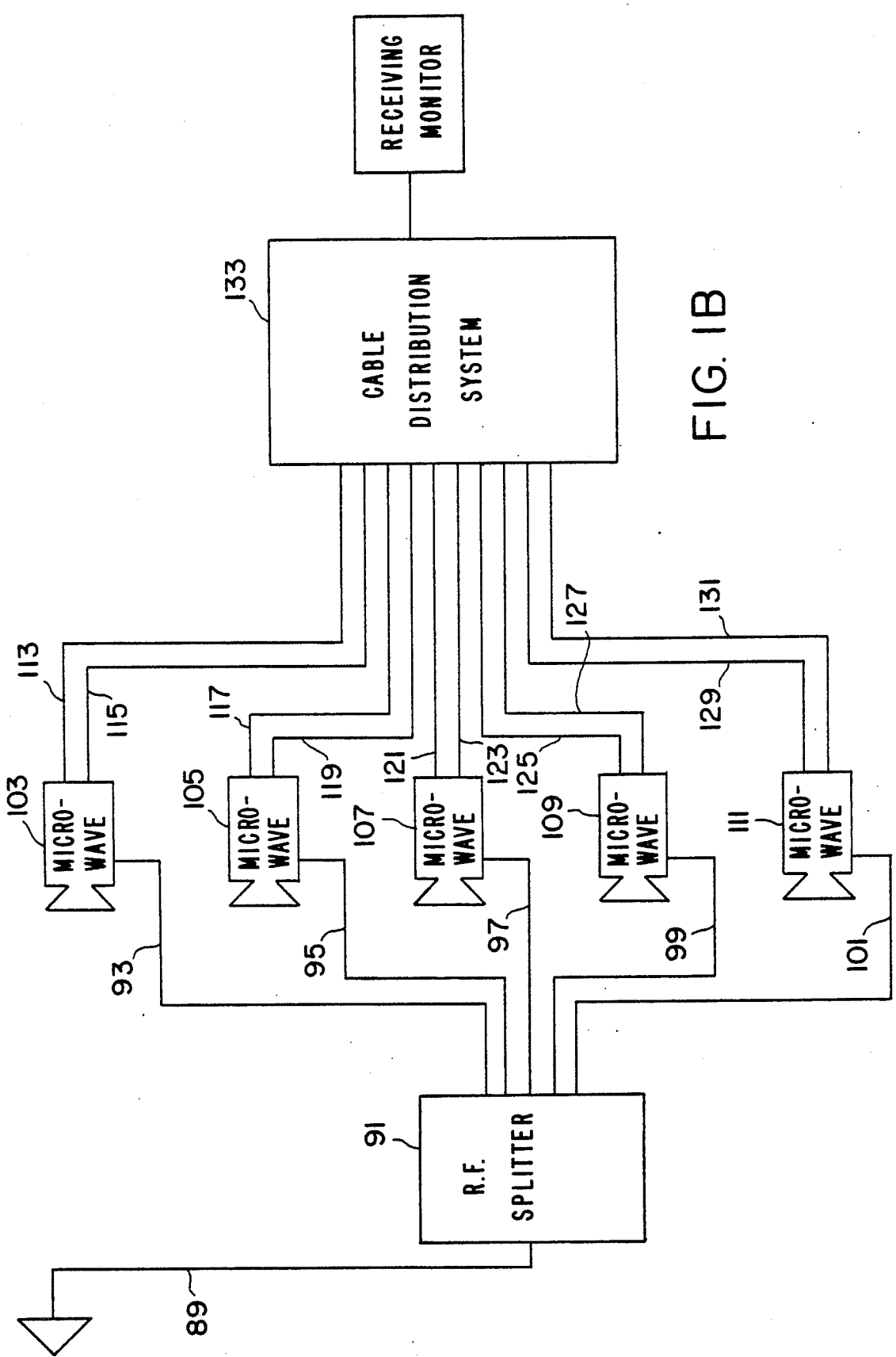

In accordance with this invention there is provided an adaptation of current broadcast systems for live programs which enhances viewer options in watching a transmitted program and thus provides a deeper viewer appreciation for the event or production telecast. Multiple access television is provided by this invention to allow the viewer active participation in selecting the camera angle or image of his choice from several video options. Each camera is trained on a different segment of an event and is associated with a different channel on a conventional receiver. In selecting a particular image from the available options, the viewer simply chooses the appropriate channel on the receiver.

A single audio is produced in association with the program line. Typically, the audio portion of the program remains constant and is not affected by changing the channel.

Multiple access television is particularly advantageous when viewing a live theatrical production or concert, for it allows a viewer to observe closely a favorite artist or instrument. In addition, multiple access television contributes to the enjoyment and understanding of a sporting event by allowing the viewer to visually isolate a particular player or group of players focused upon by different cameras. These advantages and others will be apparent from the following description and reference to the figure of drawing.

In addition, and particular to the instant invention herein described, Remote Studio 1 contains video switcher 37 which receives live signals sent from cameras 3, 5, 7 and 9 via input lines 27, 29, 31, 33 respectively. Remote Studio 1 also contains audio switcher 35 which receives signals from microphones 11, 13, 15, 17 via input lines 19, 21, 23, 25 respectively. These individual audio and video signals are fed to routing switcher 39 having the ability to distribute their signals either individually or in combination to their associated microwave transmitters 65, 67, 69, 71, 73 via input lines 45-63 inclusive. Further, having received line level audio and video through router 39, the individual microwave transmitters convert these signals to RF where they are distributed through lines 75-83 to a combining network 85 having the appropriate capacity. The combined RF is transmitted through radiating antenna 87 to receiving antenna 89 where an RF splitter 91 recovers the individual RF signals to be directed to microwaves 103, 105, 107, 109, and 111 through lines 93, 95, 97, 99 and 101 where they are restored to separate audio and video signals and sent via lines 113-131 to cable head 133 for modulation and distribution.

A practical application for Multiple Access Television is as follows: In Remote Studio 1 a program produced in a conventional manner will contain audio and video selected at the discretion of a director for broadcast through microwave 73 where it may eventually be modulated on channel 30. A viewer interested in observing a selection of audio and video (program line) need only monitor channel 30. If a viewer is interested in observing and listening to the output of Camera 1 and 3 with its associated microphone 11 the signal from Camera a line 27 and microphone 11 line 19 being fed to respective switchers are available for distribution via router 39 to microwave 65 through lines 45 and 47 possibly to be modulated on channel 31.

Additionally, through the multiple inputs and outputs of video switchers in conjunction with a routing system, any combination of assignments exist within the confines of the equipment being used. It will be possible to choose various cameras while maintaining program audio.

Preferred commercially available components for use in this system are as follows:
Cameras—Ikegami HL 79
Microphones—Electro-Voice RE—16
Audio Switcher—Ramsa WR 133
Video Switcher—Grass Valley 100
Routing Switcher—Utah Scientific AUS 1B
Microwaves X-Mit—Macom MA—12G TX
Microwaves Receive—Macom MA—12G RX Combining Network—Andrews
Antennas—Andrews 10.5-13.25 GHZ
R. F. Splitter—Andrews It is this seen that the broadcasting process described herein has distinct advantages for live telecast. Viewer interest and appreciation is enhanced through direct participation in the broadcasting process, allowing television viewing to be an active pasttime rather than a passive one. The interest and excitement generated by the instant process can only serve to enhance the broadcasting industry as a whole.

As variations of the instant invention will be apparent to one of skill in the art from a reading of the above specifications, such variations are within the spirit and scope of this invention as defined by the following appended claims.

That which is claimed is:

1. A process for broadcasting live televised programs comprising:

obtaining video signals from a plurality of video cameras, each of said cameras relaying a different selected and predetermined view of a single event or production;

producing an audio signal associated with said event or production;

receiving said video signals and said audio signal in a remote studio;

transmitting for broadcast through a single combining network said audio signal and all said video signals simultaneously to a radiating antenna;

broadcasting the combined signals from said radiating antenna;

receiving said combined and broadcasted signals by a receiving antenna in communication with a cable television distribution system; and re-transmitting said audio signal and all said video signals on a cable television distribution system where by each of a plurality of subscribers to the cable television distribution system may select any one of the video options made available by a broadcasting network.

* * * * *